(Model.)

2 Sheets—Sheet 1.

J. NOXON.
Grain Drill Distributer.

No. 242,837. Patented June 14, 1881.

Witnesses.

Lewis Tomlinson

Chas. W. Baldwin

Inventor.

James Noxon
by Ridout Aird & Co
Attys

N. PETERS, Photo-Lithographer, Washington, D. C.

(Model.)

2 Sheets—Sheet 2.

J. NOXON.
Grain Drill Distributer.

No. 242,837.　　　　　　Patented June 14, 1881.

WITNESSES:
A. B. Robertson
O. Turner

INVENTOR:
James Noxon
BY Ridout, Aird & Co.
ATTORNEYS

UNITED STATES PATENT OFFICE.

JAMES NOXON, OF INGERSOLL, ONTARIO, CANADA.

GRAIN-DRILL DISTRIBUTER.

SPECIFICATION forming part of Letters Patent No. 242,837, dated June 14, 1881.

Application filed December 23, 1880. (Model.)

*To all whom it may concern:*

Be it known that I, JAMES NOXON, of the town of Ingersoll, in the county of Oxford and Province of Ontario, Canada, a subject of the Queen of Great Britain, have invented a new and useful Grain-Drill Distributer, of which the following is a specification.

My invention relates to an improvement in a distributer having a peripheral seed-wheel and sliding sleeve provided with cut-off wings for regulating the supply of grain.

The object of my invention is to retain the grain above the center of the peripheral seed-wheel and prevent it accumulating below; and it consists in the peculiar construction and arrangements of parts, as more fully hereinafter set forth.

Figure 2:
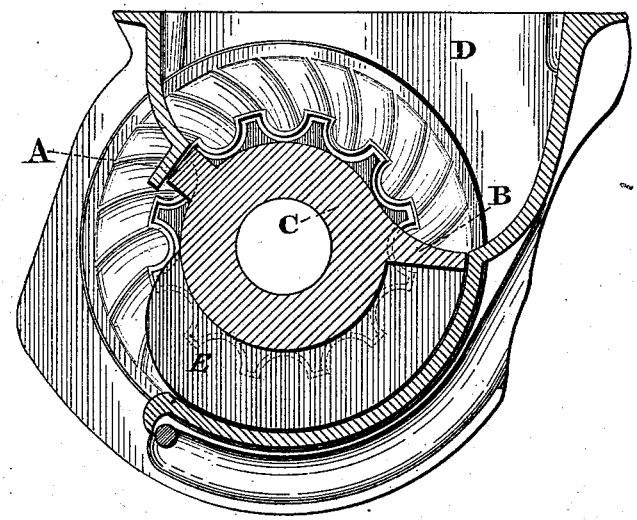
Figure 1:
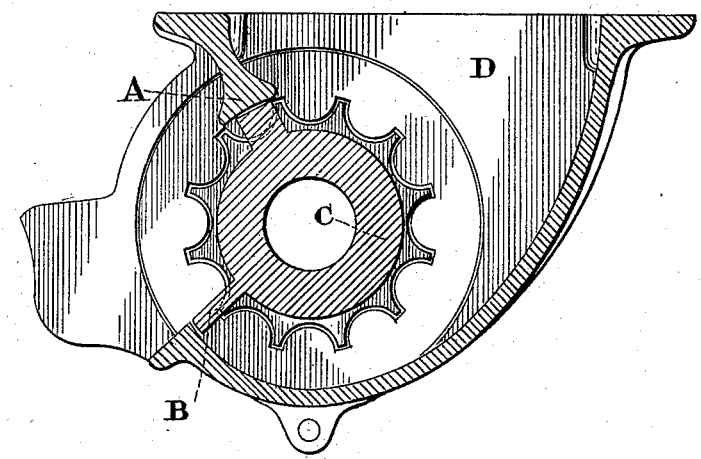
Figure 3:
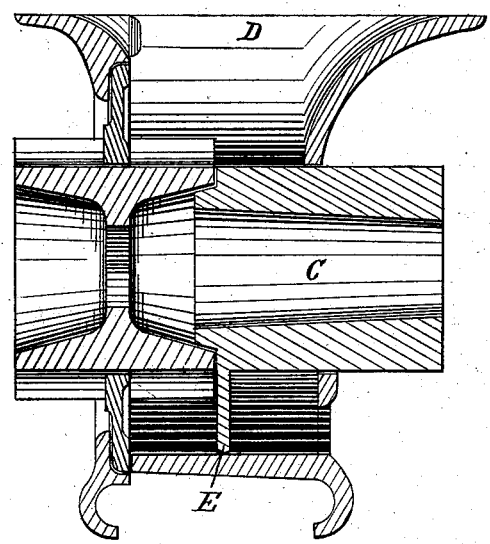
Figure 4:
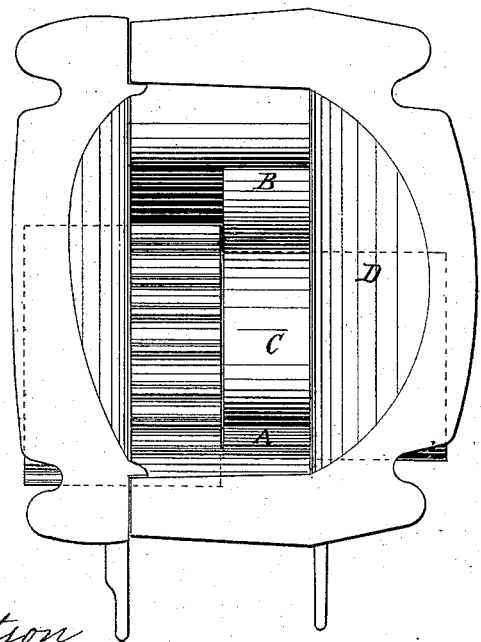

Figure 1 represents a sectional elevation of the original grain-distributer; Fig. 2, a similar view of my improved distributer; Fig. 3, a cross-section, and Fig. 4 a plan view of the same.

The grain-distributer represented in Fig. 1, while successful when used for sowing small grain—such as wheat and oats—entirely fails in the case of pease, and more especially with the larger variety of pease, as well as with beans and corn. In this distributer, Fig. 1, it will be noticed that there are two wings, A and B, on the sliding sleeve C. The wing A, as will be seen, is above the center of the peripheral wheel, while the wing B is below the center, forming a gate at the point of exit of the grain. It will be seen that a cup is formed behind the peripheral wheel, below its center, and extending from the top of the cup to the point of exit, tapering gradually to the latter point. As I have before said, small grain—such as wheat and oats—are not affected by the action of the peripheral feed-wheel, which, as will be understood, revolves for the purpose of feeding the grain toward the point of exit. In larger varieties of grain—such as pease, corn, &c.—the action of the peripheral wheel cracks much of the grain below its center, rendering it unfit for seeding purposes. With the view of overcoming this serious objection I remove, as will be seen on reference to Fig. 2, the wing B from the point of exit to a point above or near the center of the peripheral wheel, leaving a clear passage from this wing to the point of exit, thereby preventing the grain accumulating below the center of the peripheral wheel.

A division-plate, E, extends from the wing B to a point slightly beyond the exit, and closely fits the lower interior surface of the cup D. It will be noticed, on reference to Figs. 2 and 3, that the interior of the cup D is shaped so as to form an ample receptacle for the grain above the wings A and B, while, owing to the position of the said wings, the grain not actually at the time passing through the point of exit is held clear of the peripheral wheel, and thereby cannot be injuriously affected by its action, while the grain which is supplied to this wheel meets no obstruction in its passage to the point of exit, and consequently all kinds of grain can be fed through my improved distributer without any risk of the injurious result referred to as the fault of the distributer upon which mine is an improvement.

I am aware that grain-drill distributers have heretofore been supplied with sliding sleeves carrying two projecting wings, one of said wings being arranged above and the other below the sleeve, and I therefore lay no claim to such construction.

What I claim as my invention is—

1. The combination, with a scalloped rotary feed-wheel, of a sliding sleeve, C, provided with wings A B, one wing being arranged above and the other in or near a horizontal plane passing through the axis of said sleeve, substantially as described.

2. In a grain-drill distributer having a peripheral seed-wheel, a sliding sleeve, C, provided with wings A B, located above or near the center of the peripheral seed-wheel, and also provided with a division-plate, E, substantially as described, and for the purpose specified.

JAMES NOXON.

Witnesses:
G. E. PERKINS,
JNO. W. SHAVER.